(12) United States Patent
Sun et al.

(10) Patent No.: US 8,941,087 B2
(45) Date of Patent: Jan. 27, 2015

(54) PLURAL THIRD HARMONIC GENERATION MICROSCOPIC SYSTEM AND METHOD

(75) Inventors: Chi-Kuang Sun, Taipei (TW);
Ming-Rung Tsai, Taipei (TW)

(73) Assignee: National Taiwan University, Taipei (TW)

( * ) Notice: Subject to any disclaimer, the term of this patent is extended or adjusted under 35 U.S.C. 154(b) by 423 days.

(21) Appl. No.: 13/170,518

(22) Filed: Jun. 28, 2011

(65) Prior Publication Data

US 2013/0001408 A1    Jan. 3, 2013

(51) Int. Cl.
*G01N 21/86* (2006.01)
*G01V 8/00* (2006.01)
*G02B 21/00* (2006.01)

(52) U.S. Cl.
CPC .......... *G02B 21/00* (2013.01); *G02B 2207/114* (2013.01)
USPC .................. 250/559.29; 250/201.3; 359/329; 359/368

(58) Field of Classification Search
CPC ...... G01B 9/04; G02B 21/00; G02B 21/0004; G02B 21/0016; G02B 21/0096; G02B 21/06; G02B 1/0076
USPC ................... 250/559.29, 201.3; 359/326–332, 359/368–373, 381
See application file for complete search history.

(56) References Cited

U.S. PATENT DOCUMENTS

| | | | |
|---|---|---|---|
| 6,922,279 B2 | 7/2005 | Sun et al. | |
| 8,471,193 B2 * | 6/2013 | Taira et al. | 250/227.23 |
| 2004/0113059 A1 * | 6/2004 | Kawano et al. | 250/234 |
| 2005/0063041 A1 * | 3/2005 | Sun et al. | 359/328 |
| 2005/0110988 A1 * | 5/2005 | Nishiyama et al. | 356/237.5 |
| 2006/0012785 A1 * | 1/2006 | Funk et al. | 356/301 |
| 2006/0238745 A1 * | 10/2006 | Hashimoto et al. | 356/73 |

FOREIGN PATENT DOCUMENTS

| | | | | |
|---|---|---|---|---|
| GB | 2312805 | | 11/1997 | |
| JP | WO2010/100745 | * | 9/2010 | G01N 21/25 |

* cited by examiner

*Primary Examiner* — Francis M Legasse, Jr.
(74) *Attorney, Agent, or Firm* — WPAT, P.C.; Anthony King

(57) ABSTRACT

The present invention provides a plural third harmonic generation (THG) microscopic system and method. The system includes a laser device, a microscopic device, a beam splitter device and a photodetective device. By utilizing lasers with different central wavelengths or a broad band light source to simultaneously analyze THG response with respect to different wavelengths, a plurality of THG images and THG spectrum of the material or bio-tissue under stimulation of different wavelengths are obtained, thereby retrieving distributed microscopic images and resonant characteristics of the observational material or bio-molecules.

13 Claims, 5 Drawing Sheets

PLURAL THIRD HARMONIC GENERATION MICROSCOPIC SYSTEM AND METHOD

BACKGROUND OF THE INVENTION

1. Field of the Invention

The invention relates to a plural third harmonic generation (THG) microscopic system and method, in particular to a plural third harmonic generation (THG) microscopic system and method applied to bio-molecules in vivo and medical engineering.

2. Description of Related Art

The technique of third harmonic generation (THG), with the advantages of having no light harm, no light bleaching, high penetrating depth and having resolution of sub-micron, has been widely applied in research of bio-images. The harmonic generation microscopy disclosed in U.S. Pat. No. 6,922,279 is directed to a microscopic system making use of a third harmonic generation incorporated with a second harmonic generation and having no fluorescent light, and is focused on the application in bio-medicine. As revealed in an essay published in "Resonant Frequency-domain Interferometry via Third Harmonic Generation," Optics Letter 32, 1265-1267 (2007) by D. S. Stoker, J. W. Keto, J. Baek and J. Ma, the THG is also applied in the spectrum science to understand the structure and characteristics of the material or bio-molecules. However, such research is more or less insufficient with respect to imaging of bio-molecules, due to that the existing THG microscopic system merely provides a harmonic generation image with a single wavelength. That is, measuring the strength of the THG and then mapping the same to form an intensity image. As a result, only the morphalogy of the bio-cells and bio-tissues can be known. Further, the existing research of applying the THG in the spectrum science makes use of directly modulating the wavelength of a laser beam to obtain a spectrum of the THG, while unable to provide spatially distributed related information and unable to provide the function of simultaneously presenting a plurality of THG images.

SUMMARY OF THE INVENTION

The present invention is mainly purposed to provide a plural third harmonic generation (THG) microscopic system, utilizing lasers with different central wavelengths or a broad band light source to simultaneously analyze THG response with respect to different wavelengths, while to obtain a plurality of THG images and THG spectrum of the material or bio-tissues, and then to retrieve microscopic images of the bio-molecules, such that it is adapted to provide molecule imaging ability in THG microscopy of clinical medicine.

A further object of the invention is to provide a plural third harmonic generation (THG) microscopic system, comprising:

a laser device for irradiating a laser beam with a plurality of different wavelengths;

a microscopic device for receiving the laser beam with a plurality of different wavelengths and projecting the same onto an observational sample, thereby producing a third harmonic generation observational beam with a plurality of different wavelengths;

a beam splitter device for splitting the third harmonic generation observational beam into a first third harmonic generation portion and a second third harmonic generation portion; and a photodetective device for respectively detecting the first third harmonic generation portion and the second third harmonic generation portion and converting into a first third harmonic generation image signal or a first third harmonic generation spectrum signal and a second third harmonic generation image signal or a second third harmonic generation spectrum signal.

According to the plural third harmonic generation (THG) microscopic system of the invention, the photodetective device is used for respectively detecting the first third harmonic generation portion and the second third harmonic generation portion and simultaneously converting the same into a first third harmonic generation image signal or a first third harmonic generation spectrum signal and a second third harmonic generation image signal or a second third harmonic generation spectrum signal.

According to the plural third harmonic generation (THG) microscopic system of the invention, the photodetective device is used for further detecting a third THG portion or more THG portions, while simultaneously converting into a third THG image signal or a third THG spectrum signal and more THG image signals or more THG spectrum signals.

The plural third harmonic generation (THG) microscopic system of the invention further comprises a computer system and an image processing software, for receiving the first THG image signal or the first THG spectrum signal and the second THG image signal or the second THG spectrum signal, while simultaneously processing a first THG image or a first THG spectrum and a second THG image or a second THG spectrum of the observational sample.

According to the plural third harmonic generation (THG) microscopic system of the invention, the laser device is preferably a single laser for producing a broad band short pulse laser.

According to the plural third harmonic generation (THG) microscopic system of the invention, the laser device is preferably a short pulse laser to irradiate onto an optical fiber or non-linear material for producing a laser beam with broad band or having a plurality of various wavelengths.

According to the plural third harmonic generation (THG) microscopic system of the invention, preferably, the laser device includes a plurality of short pulse lasers having different central wavelengths.

According to the plural third harmonic generation (THG) microscopic system of the invention, preferably, the photodetective device includes a plurality of photomultiplier tube photodetectors.

According to the plural third harmonic generation (THG) microscopic system of the invention, preferably, the photodetective device includes a spectrometer.

According to the plural third harmonic generation (THG) microscopic system of the invention, the microscopic device includes:

a scanning system for scanning the laser beam;

a mirror for receiving the scanned laser beam and reflecting the same; and an object lens for focusing the reflected laser beam and irradiating the laser beam onto the sample.

According to the plural third harmonic generation (THG) microscopic system of the invention, the beam splitter device is preferably a dichroic beam splitter.

A still further object of the invention is to provide a plural third harmonic generation (THG) microscopic method, comprising the following steps:

providing a laser device for irradiating a laser beam with a plurality of different wavelengths;

using a microscopic device for projecting the laser beam onto an observational sample to produce a THG observing beam having a plurality of various wavelengths, in which the THG observing beam includes a THG light having a first wavelength and a THG light having a second wavelength;

separating the THG light having a first wavelength with the THG light having a second wavelength;

respectively converting the THG light having a first wavelength and the THG light having a second wavelength into a corresponding first electrical signal and a second electrical signal; and processing the first electrical signal and the second electrical signal to simultaneously forming a plural THG image or a plural THG spectrum of the observational sample.

According to the plural third harmonic generation microscopic method of the invention, the THG beam further includes a THG light with a third wavelength or more wavelengths to be respectively converted into a corresponding third electrical signal or more electrical signals.

According to the plural third harmonic generation microscopic method of the invention, preferably, the laser device is a single laser for producing a broad band short pulse laser.

According to the plural third harmonic generation microscopic method of the invention, preferably, the laser device is a short pulse laser to irradiate onto an optical fiber or nonlinear material for producing a laser beam with broad band or having a plurality of various wavelengths.

According to the plural third harmonic generation microscopic method of the invention, preferably, the laser device includes a plurality of short pulse lasers having different central wavelengths.

DETAILED DESCRIPTION OF THE PREFERRED EMBODIMENT

Accompanied by the drawings, it will be explained below the preferred embodiments of the plural third harmonic generation (THG) microscopic system of the invention.

Figure 1:
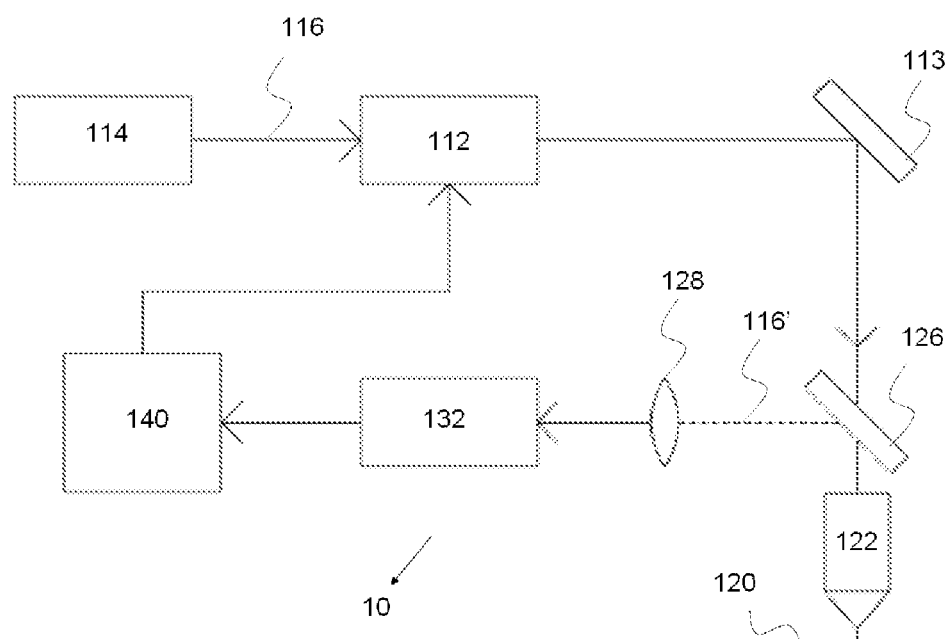
FIG. 1 shows a plural third harmonic generation (THG) microscopic system according to a first preferred embodiment of the invention.

Please refer to FIG. 1. It shows a plural third harmonic generation (THG) microscopic system 10 according to a first preferred embodiment of the invention. The system 10 comprises a scanning device 112, capable of receiving a laser beam 116 from a laser device or laser source 114. The scanning device 112 provides the function of producing a two-dimensional scanning laser beam, and is one, such as being installed with a rotating two-dimensional lens set (not shown), for directing the laser beam onto to a reflective mirror 113, in which the laser beam is reflected and directed to a dichroic beam splitter 126 and then incident downward to a microscopic device (not shown). The microscopic device includes an object lens 122. After that, the laser beam is focused by the object lens 122 and irradiated onto an observational sample 120 to produce a third harmonic generation (THG) signal. A third harmonic generation beam (THG beam) 116', being reversely incident on the object lens 122 from the observational sample and irradiated to the dichroic beam splitter 126, is split and irradiated onto a lens 128. The third harmonic generation beam 116' is processed by a spectrometer 132, a signal of the third harmonic generation beam 116' is converted into an analog signal by such as a photodetector, and the analog signal is amplified by an electrical amplifier and converted into a digital image signal or spectrum signal by an Analog/Digital converter, which is then transferred to a computer system 140 to produce a plurality of THG image signals with different wavelengths or a THG spectrum, and then to show a plurality of THG images with different wavelengths or a THG spectrum. FIG. 1 is directed to a collection approach of backward collection.

Figure 2:
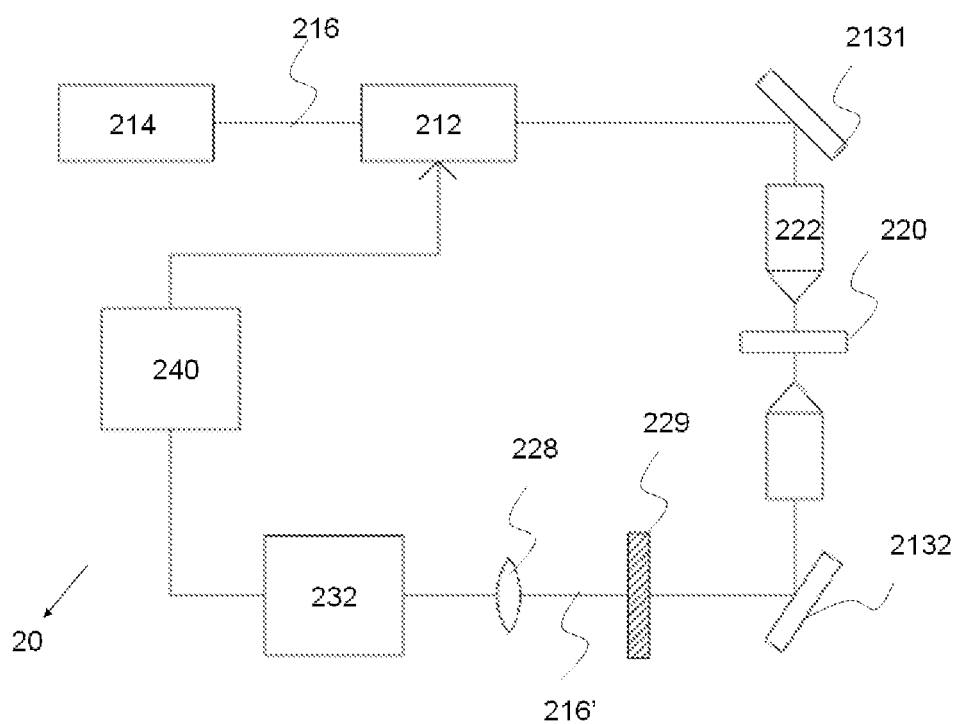
FIG. 2 shows a plural third harmonic generation (THG) microscopic system according to a second preferred embodiment of the invention.

Please refer to FIG. 2. FIG. 2 shows a plural third harmonic generation (THG) microscopic system 20 according to a second preferred embodiment of the invention. The system 20 comprises a scanning device 212, capable of receiving a laser beam 216 from a laser device or laser source 214. The scanning device 212 provides the function of producing a two-dimensional scanning laser beam, and is one, such as being installed with a rotating two-dimensional lens set (not shown), for directing the laser beam onto to a reflective mirror 2131. The laser beam 216 is then directed to a microscopic device (not shown), being provided with an object lens 222. After that, the laser beam is focused by the object lens 222 and irradiated onto an observational sample 220 to produce a third harmonic generation (THG) signal. A third harmonic generation beam (THG beam) 216' after collection is reflected by a reflective mirror 2132, passes a light filter 229 and a lens 228, and is directed to a spectrometer 232. A signal of the third harmonic generation beam is converted into an analog signal by such as a photodetector, and the analog signal is amplified by an electrical amplifier and converted into a digital image signal or spectrum signal by an Analog/Digital converter, which is then transferred to a computer system 240 to produce a plurality of THG image signals with different wavelengths or a THG spectrum, and then to show a plurality of THG images with different wavelengths or a THG spectrum. FIG. 2 is directed to a collection approach of forward collection.

Figure 3:
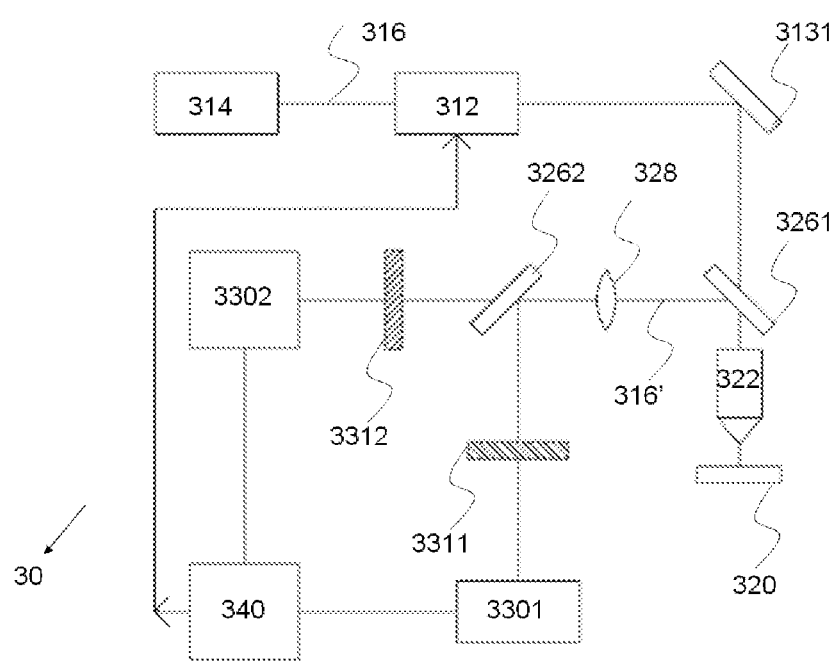
FIG. 3 shows a plural third harmonic generation (THG) microscopic system according to a third preferred embodiment of the invention.

Please refer to FIG. 3. FIG. 3 shows a plural third harmonic generation (THG) microscopic system 30 according to a third preferred embodiment of the invention. The system 30 comprises a scanning device 312, capable of receiving a laser beam 316 from a THG laser device or THG laser source 314. The scanning device 312 provides the function of producing a two-dimensional scanning laser beam, and is one, such as being installed with a rotating two-dimensional lens set (not shown), for directing the laser beam onto to a reflective mirror 3131. The laser beam reflected therefrom is directed to a dichroic beam splitter 3261 and then incident downward to a microscopic device (not shown), being provided with an object lens 322. After that, the laser beam is focused by the object lens 322 and irradiated onto an observational sample 320 to produce a third harmonic generation (THG) signal. A third harmonic generation beam (THG beam) 316' is reversely incident onto the object lens 322, and incident on a lens 328. Then, after irradiating on a dichroic beam splitter 3262 and splitting, the THG beam downward passes an interferometric light filter 3311 and irradiates on a photodetector 3301. A signal of the third harmonic generation beam is converted into an analog electrical signal thereby, and the analog electrical signal is amplified by an amplifier and converted into a digital image signal or spectrum signal by an Analog/Digital converter, which is then transferred to a computer system 340 to show a THG image signals with a first wavelength or a THG spectrum. The THG beam leftward passes an interferometric light filter 3312 and irradiates on a photodetector 3302. A signal of the third harmonic generation beam is converted into an analog electrical signal thereby, and the analog electrical signal is amplified by an amplifier and converted into a digital image signal or a THG spectrum signal by an Analog/Digital converter, which is then transferred to the computer system 340 to show a THG image signal with a second wavelength or a THG spectrum. FIG. 3 is directed to a collection approach of backward collection.

Figure 4:
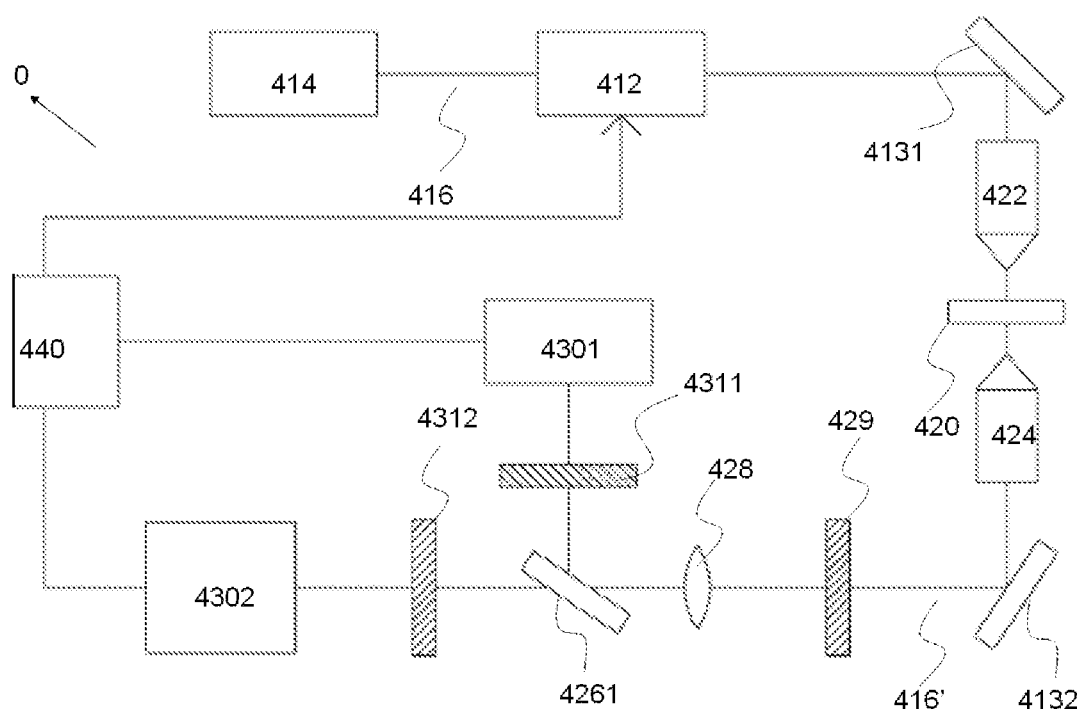
FIG. 4 shows a plural third harmonic generation (THG) microscopic system according to a fourth preferred embodiment of the invention.

Please refer to FIG. 4. FIG. 4 shows a plural third harmonic generation (THG) microscopic system 40 according to a fourth preferred embodiment of the invention. The system 40 comprises a scanning device 412, capable of receiving a laser beam 416 from a THG laser device or THG laser source 414. The scanning device 412 provides the function of producing a two-dimensional scanning laser beam, and is one, such as being installed with a rotating two-dimensional lens set (not shown), for directing the laser beam onto to a reflective mirror 4131 and then incident downward to a microscopic device (not shown), being provided with an object lens 422. After that, the laser beam is focused by the object lens 422 and irradiated onto an observational sample 420 to produce a third harmonic generation (THG) signal. A third harmonic generation beam (THG beam) downward therefrom passes a beam collection device 424 for collection and then reflected by a reflective mirror 4132. after passing a light filter 429, the beam irradiates and passes a lens 428 and is incident to a dichroic beam splitter 4261. After splitting, the beam is incident upward to an interferometric light filter 4311 and irradiated on a photodetector 4301. A signal of the third harmonic generation beam is converted into an analog electrical signal thereby, and the analog electrical signal is amplified by an amplifier and converted into a digital image signal or spectrum signal by an Analog/Digital converter, which is then transferred to a computer system 440 to show a THG image signal with a first wavelength or a THG spectrum. The THG beam leftward passes an interferometric light filter 4312 and irradiates on a photodetector 4302. A signal of the third harmonic generation beam is converted into an analog electrical signal thereby, and the analog electrical signal is amplified by an amplifier and converted into a digital image signal or a THG spectrum signal by an Analog/Digital converter, which is then transferred to the computer system 440 to show a THG image signals with a second wavelength or a THG spectrum. FIG. 4 is directed to a collection approach of forward collection.

Figure 5:
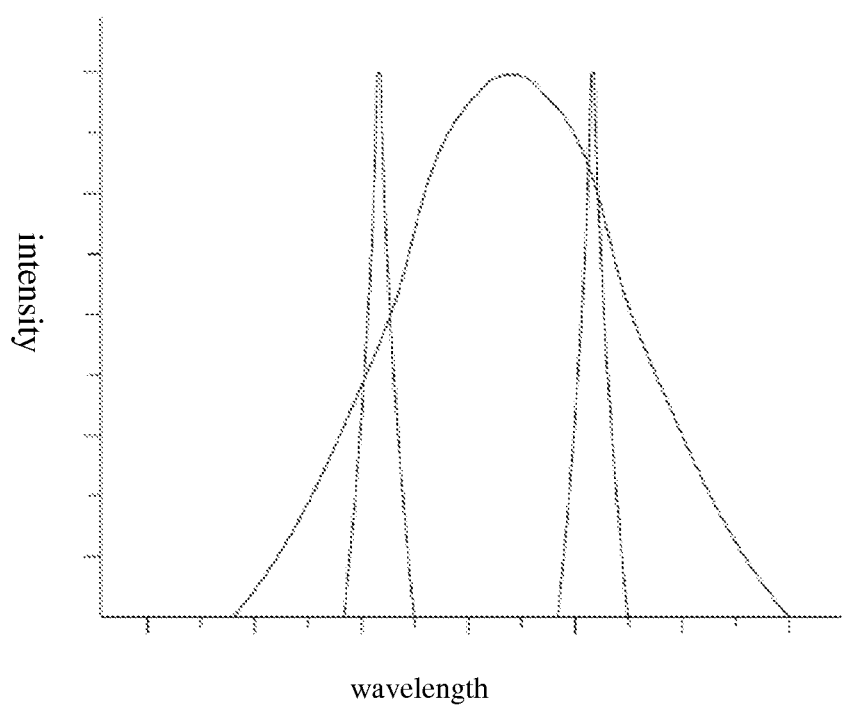
FIG. 5 shows a function diagram of strength versus wavelength of a laser source.

According to the invention, the laser device or laser source 114, 214, 314, 414 may be a single laser output device. For example, a broad band short pulse laser may be produced by a single laser to thereby obtain a beam with a plurality of wavelengths. As shown in FIG. 5, such a beam has a broader band. Or, the laser device is a short pulse laser to irradiate onto an optical fiber or other non-linear material for producing two or more than two short pulse lasers having two different central wavelengths as shown in FIG. 5. The laser source 114, 214, 314, 414 may be a plurality of laser output devices, utilizing a plurality of short pulse lasers having different central wavelengths as a multi-wavelengthed laser source. The laser source may be one revealed in 1.2- to 2.2-μm Tunable Raman Soliton Source Based on a Cr: Forsterite Laser and a Photonic-Crystal Fiber, IEEE PHOTONICS TECHNOLOGY LETTERS, VOL. 20, No. 11, Jun. 1, 2008.

The photodetector of the invention may be any kind of photodetector for sensing a laser beam, such as a photomultiplier tube photodetector.

The number of the photodetector in the invention is not limited to two. Three or more than three photodetectors may be allocated to detect three or more than three THG light having different wavelengths.

In the microscopic device, the molecular images may be inspected. Such an advantage further facilitates an application of noninvasive clinical molecular imaging in vivo. For example, from the flowing situation of the red blood cell in capillaries of human tissue, the distributed microscopic images of the red oxyhemoglobin and dark deoxyhemoglobin may be observed.

According to the invention, the computer system 140, 240, 340, 440 may be any kind of PC, notebook computer, and small notebook computer. The image processing software may be any kind of THG image processing software, such as Fluoview 300 of Olympus.

The plural THG microscopic method of the invention may further comprise a scanning step, which may use a THG beam to proceed with a two-dimensional planar scanning and imaging at a certain depth of the sample, so as to retrieve plural THG images and THG spectrum with different wavelengths in a noninvasive manner.

A further advantage of the invention lies in providing a noninvasive, multi-wavelengthed THG microscopic system, when incorporating with a THG spectrum analysis of different wavelengths produced simultaneously, it is capable of obtaining distributed microscopic images and characteristics of bio-molecules.

Although the present invention has been explained in relation to its preferred embodiments, it is to be understood that other possible modifications and variations can be made without departing from the scope of the invention as claimed below.

We claim:

1. A plural third harmonic generation (THG) microscopic system for retrieving spatial distribution microscopic images and characteristics of bio-molecules, comprising:
    a laser device, for irradiating a laser beam with a plurality of different wavelengths;
    a scanning device for receiving the laser beam with the plurality of different wavelengths, producing a two-dimensional scanning laser beam and directing the laser beam onto a reflective minor;
    a beam splitter device for receiving the laser beam reflected from the reflective minor and directing the reflected laser beam to a microscopic device;
    the microscopic device, including an object lens, for focusing the laser beam with the plurality of different wavelengths and irradiating the same onto an observational sample of the bio-molecules, thereby producing a THG signal for each wavelength responded from the observational sample, in which a THG beam with the THG response signal for each wavelength is incident on the object lens, irradiated to the beam splitter device, and split and irradiated onto a lens;
    a spectrometer, for processing the THG response signal for each wavelength, which response signal for each wavelength is each converted into an analog signal;
    an Analog/Digital converter, for converting the analog signal for each wavelength into a digital image signal and/or spectrum signal; and
    a computer system for receiving the digital image signal and/or spectrum signal and producing a plurality of THG image signals with different wavelengths or a THG spectrum.

2. The plural third harmonic generation (THG) microscopic system as claimed in claim 1, wherein the spectrometer is a photodetective device for respectively detecting a first third harmonic generation portion and a second third harmonic generation portion and simultaneously converting into a first third harmonic generation image signal or a first third harmonic generation spectrum signal and a second third harmonic generation image signal or a second third harmonic generation spectrum signal.

3. The plural third harmonic generation (THG) microscopic system as claimed in claim 1, wherein the laser device is a single laser for producing a broad band short pulse laser.

4. The plural third harmonic generation (THG) microscopic system as claimed in claim 1, wherein the laser device is a short pulse laser to irradiate onto an optical fiber or non-linear material for producing a laser beam with broad band or having a plurality of various wavelengths.

5. The plural third harmonic generation (THG) microscopic system as claimed in claim 1, wherein the laser device includes a plurality of short pulse lasers having different central wavelengths.

6. The plural third harmonic generation (THG) microscopic system as claimed in claim 1, wherein the beam splitter device is a dichroic beam splitter.

7. The plural third harmonic generation (THG) microscopic system as claimed in claim 2, wherein the photodetective device is used for further detecting a third THG portion or more THG portions, while simultaneously converting into a third THG image signal or a third THG spectrum signal and more THG image signals or more THG spectrum signals.

8. The plural third harmonic generation (THG) microscopic system as claimed in claim 2, wherein the photodetective device includes a plurality of photomultiplier tube photodetectors.

9. A plural third harmonic generation (THG) microscopic method for retrieving spatial distribution microscopic images and characteristics of bio-molecules, comprising the following steps:
   providing a laser device for irradiating a laser beam with a plurality of different wavelengths;
   using a microscopic device, including an object lens, for focusing the laser beam with the plurality of different wavelengths onto an observational sample of the bio-molecules to produce a THG response signal for each wavelength responded from the observational sample, in which the THG response signal includes a THG light having a first wavelength and a THG light having a second wavelength;
   separating the THG light having a first wavelength with the THG light having a second wavelength;
   respectively converting the THG light having a first wavelength and the THG light having a second wavelength into a corresponding first electrical signal and a corresponding second electrical signal; and
   processing the first electrical signal and the second electrical signal to simultaneously forming a plural THG images or a plural THG spectrum of the observational sample.

10. The plural third harmonic generation microscopic method as claimed in claim 9, wherein the THG response signal further includes a THG light with a third wavelength or more wavelengths to be respectively converted into a corresponding third electrical signal or more electrical signals.

11. The plural third harmonic generation microscopic method as claimed in claim 9, wherein the laser device is a single laser for producing a broad band short pulse laser.

12. The plural third harmonic generation microscopic method as claimed in claim 9, wherein the laser device is a short pulse laser to irradiate onto an optical fiber or non-linear material for producing a laser beam with broad band or having a plurality of various wavelengths.

13. The plural third harmonic generation microscopic method as claimed in claim 9, wherein the laser device includes a plurality of short pulse lasers having different central wavelengths.

* * * * *